United States Patent [19]
Zinner

[11] Patent Number: 5,161,920
[45] Date of Patent: Nov. 10, 1992

[54] CUTTING TOOL WITH CUTTING INSERT

[75] Inventor: Karl Zinner, Nuremberg, Fed. Rep. of Germany

[73] Assignee: Zinner GmbH Präzisionswerkzeug, Nuremberg, Fed. Rep. of Germany

[21] Appl. No.: 485,199

[22] Filed: Feb. 26, 1990

[30] Foreign Application Priority Data

Mar. 22, 1989 [DE] Fed. Rep. of Germany ....... 3909358

[51] Int. Cl.$^5$ .............................................. B26D 1/00
[52] U.S. Cl. .................................. 407/110; 407/114; 407/117
[58] Field of Search ............... 407/110, 113, 117, 50, 407/114, 109, 40

[56] References Cited

U.S. PATENT DOCUMENTS

| | | | |
|---|---|---|---|
| 3,158,921 | 12/1964 | Yost | 407/117 |
| 3,599,303 | 8/1971 | Sletten | 407/117 |
| 3,774,276 | 11/1973 | Eckle | 407/117 |
| 3,825,981 | 7/1974 | Cochran et al. | 407/113 |
| 3,844,008 | 10/1974 | Sletten | 407/110 |
| 3,894,322 | 7/1975 | Pano | 407/110 |
| 4,195,956 | 4/1980 | Mihic | 407/117 |
| 4,580,930 | 4/1986 | Zinner | 407/117 |
| 4,992,007 | 2/1991 | Satran | 407/117 |
| 4,992,008 | 2/1991 | Pano | 407/114 |

FOREIGN PATENT DOCUMENTS

| | | | |
|---|---|---|---|
| 59602 | 9/1982 | European Pat. Off. | |
| 242343 | 10/1987 | European Pat. Off. | |
| 2259216 | 9/1973 | Fed. Rep. of Germany | |
| 2647546 | 4/1978 | Fed. Rep. of Germany | 407/117 |
| 3219150 | 11/1983 | Fed. Rep. of Germany | |
| 3810032 | 10/1988 | Fed. Rep. of Germany | |
| 3942585 | 7/1990 | Fed. Rep. of Germany | 407/110 |
| 225215 | 8/1979 | France | |

*Primary Examiner*—Larry I. Schwartz
*Assistant Examiner*—Kevin J. Carroll
*Attorney, Agent, or Firm*—Jordan and Hamburg

[57] ABSTRACT

The invention is directed to a cutting tool with a cutter bit or a carving insert, which is held exchangeably in a one-piece tool support and lies in contact with opposite jaws of the tool support that form a clamping gap, with prismatic clamping surfaces disposed in common with those of the jaws and with at least one clamping element, such as a tightening screw for narrowing the clamping gap and with at least one separately formed clamping surface section, which, with respect to the direction of the clamping force initiated by the manipulated tightening screw, runs obliquely in such a manner, that a component of force, which is directed towards the open end of the clamping gap, acts upon the cutter bit.

13 Claims, 3 Drawing Sheets

CUTTING TOOL WITH CUTTING INSERT

BACKGROUND OF THE INVENTION

The invention is directed to a cutting tool with a cutter bit or a carving insert, which is held exchangeably in one-piece tool support and lies in contact with opposite jaws of the tool support that form a clamping gap, with prismatic clamping surfaces disposed in common with those of the jaws, and with a tightening screw for narrowing the clamping gap.

To achieve a high transverse stability in narrow square-nosed cutting tools with interchangeable cutting inserts, the provision of a further, separate element, namely a tensioning blade, in addition to the cutter bit and the tool support, is known (German Offenlegungsschrift 34 34 089). This tensioning blade is carried in the tool holder, can be shifted longitudinally and, when the tightening screw is tightened, is pressed forwards to clamp the cutter bit against the tool support. However, to realize this longitudinal shift, a relatively expensive, precise linear guiding system for the tensioning blade must be formed in the tool support. Moreover, the cutter bit must constantly be disposed, so that it is inclined to the carving or guiding direction.

In known tools of the initially described type (see German Patent 32 19 150), the clamping surface of at least one clamping jaw is provided with a reentrant syncline or convexity, which is preferably triangular in cross section and corresponds to the construction of the adjoining clamping surface of the cutter bit. Due to the doubly prismatic construction of the mounting section and, conversely, due to mutually opposite triangular grooves in the clamping surfaces of the cutter bit, the latter is held particularly well and securely despite transverse stresses. Moreover, an additional clamping screw is provided, which presses the clamping jaw, which can be dropped open, over the elastic resiliency measure against the cutter bit during the propping open process. Admittedly, in the position in which it is used, the clamping surface of the clamping jaw that can be propped open gradually rises relative to the clamping surface of the cutter bit towards the interior of the clamping gap, so that the actual clamping point is at an appreciable distance from the rear end of the cutter bit. However, because of the construction of the prismatic clamping surfaces, said clamping or tightening screw generates only force components, which are approximately perpendicular to the longitudinal direction of the clamping gap. A combined effect of the clamping force of the tightening or clamping screw and the actual clamping point, which is shifted forwards, is not brought about by these means.

SUMMARY OF THE INVENTION

Therefore the problem, on which the invention is based, is raised, namely, to assure in a tool of the initially mentioned type a clamping of the cutter bit, which is secure and reliable towards all sides, while avoiding the disadvantages that have been mentioned. In particular, it is an object of the invention to provide a vice grip wrench-like envelopment on all sides of the cutter bit in the clamping seat, without increasing the number of constructional or functional elements or the manufacturing or maintenance expenses. To solve this problem, it is proposed, pursuant to the invention, to provide in a cutting tool with the initially cited characteristics at least one separately formed clamping surface section, which runs obliquely to the direction of the clamping force triggered by the manipulated tightening screw in such a manner, that a force component, directed towards the open end of the clamping gap, acts upon the cutter bit.

By means of the component of force directed towards the clamping gap opening at the front end, the cutter bit is pressed against the supports that are disposed in the vicinity of the opening, for example, against a clamping point, so that the safety with respect to cutting forces attacking all around is increased further. By forming a clamping surface section that runs at an angle, an inclined plane or ramp is formed, on which the gripping power of the tightening screw impacts and can be divided into components perpendicular and parallel to the longitudinal direction of the clamping gap. A separate clamping element, which is guided linearly by the tool support as in the state of the art, can be omitted; instead, pursuant to the inventive concept, the swivelling of a jaw, which constricts the clamping gap, in conjunction with the inclined at the cutter bit, is utilized surprisingly simply to produce the desired components of force. The inventive concept can be used with cutter bits, the surfaces of which, bordering on the clamping jaws, are disposed prismatically in such a manner, that they project convexly ("positive prisms") as well as slope concavely towards the inside, for example, in that they form a V groove ("negative prisms").

To realize the invention, it is advisable that the clamping surface section, which is constructed specifically in accordance with the invention, runs out into an acute angle relative to the longitudinal axis of the tightening screw. If the tightening screw extends approximately transversely to the longitudinal direction of the clamping gap, an obtuse angle necessarily results between the clamping surface section, which runs obliquely in accordance with the invention, and the longitudinal direction of the clamping gap.

It is advantageous if the clamping surfaces of at least one jaw are divided into at least two sections disposed one behind the in the longitudinal direction of the gap, one of which runs obliquely to the direction of the clamping force and when the tightening screw is manipulated, produces the component of force in the direction of the opening of the clamping gap. A special construction of this concept consists therein that the oblique clamping surface section is disposed, in the direction of the gap opening, after the clamping screw and before the adjoining clamping surface section, the opposite abutment faces of this adjacent clamping surface section diverging as the distance from the open front end of the clamping gap increases. By these means, the initially named, aimed for effective connection with the clamping point, which is situated immediately in front and is formed by inwardly rising clamping surfaces, is achieved. When the tightening screw is tightened, the clamping force resulting therefrom presses on the inclined clamping surface segment, the component of force in the direction of the opening of the clamping gap developing. This component of the force presses the cutter bit somewhat in the direction of the opening of the clamping gap and, with that, on the clamping point situated immediately in front. By these means, a clamping of the cutter bit is achieved, which is strong all around and secured, above all, also against lateral forces. According to the inventive concept, this is achieved in a simple manner, essentiall without any additional structural means, for example, indirectly tensioning blades manipulated by guides. In particular, pursuant to a further development of the invention, the jaw with the clamping section running obliquely with respect to the clamping force, can be constructed as a clamping claw, which can be adjusted directly by the tightening screw.

For realizing a clamping surface which runs obliquely to the clamping force, between the jaw of the tool support and the separately formed clamping surface section of the tool insert, it is advisable to provide a projection, which projects from the clamping jaw into the clamping gap and, at the same time, presses against the tool insert or its clamping surface section. In order to be able to direct or concentrate this pressure on a particular point of attack of the tool insert or in a desired direction, the clamping surfaces, which transfer the pressure, are formed concavely and/or convexly in the longitudinal direction of the clamping gap; such indentations or bulges prevent the points of attack slipping in the longitudinal direction.

The invention is applicable advantageously in cutting tools inserts, particularly carving inserts or cutter bits, which on opposite sides have prismatically disposed clamping surfaces for abutting on opposite jaws of a tool support, which form a clamping gap. A development of such a tool insert, which lies within the scope of the inventive concept, consists therein that on at least one side, separate clamping surface sections, which together form the boundary of an obtuse angle that opens out towards the opposite side, are formed one behind the other in the longitudinal direction in different planes.

Moreover, the apex of the wedge angle projects towards the facing jaw of the clamping gap, which has complementarily formed, preferably prismatic abutment or clamping surfaces. With the legs of the wedge, which advantageously extend in the longitudinal direction of the cutter bit, inclined planes or ramps are formed, which are acted upon by the gripping or clamping forces that, at the same time, can split up onto force components, which bring about an enveloping pliers action for the cutter bit.

In a further development of the inventive tool insert, which serves to simplify its production, one of the clamping surface sections, which are disposed in the obtuse wedge angle, runs parallel to the clamping surfaces of the opposite side. By these means, the tool insert can also be inserted easily into the clamping gap, since the prismatic clamping surfaces, which are formed on opposite jaws, then also run parallel and form a guide for the insertion of the tool insert into the clamping gap.

Finally, a particularly advantageous development of the inventive tool insert consists therein that on one side three separate clamping surfaces sections are formed, of which the middle one is parallel to the clamping surfaces of the opposite side and the two outer ones are tapered so as to form an obtuse angle with the middle one and be symmetrical to one another. This development is suitable, above all, for cutter bits with cutting wedges on opposite ends. If the cutting surface of one cutting wedge is blunt, the cutter bit can be pulled out of the clamping gap and inserted again in the reverse way, so that the unused cutting edge protrudes towards the outside.

Further characteristics, details and advantages arise out of the following description of preferred examples of the operation of the invention, as well as from the Figures.

DESCRIPTION OF THE PREFERRED EMBODIMENTS

Figure 1:
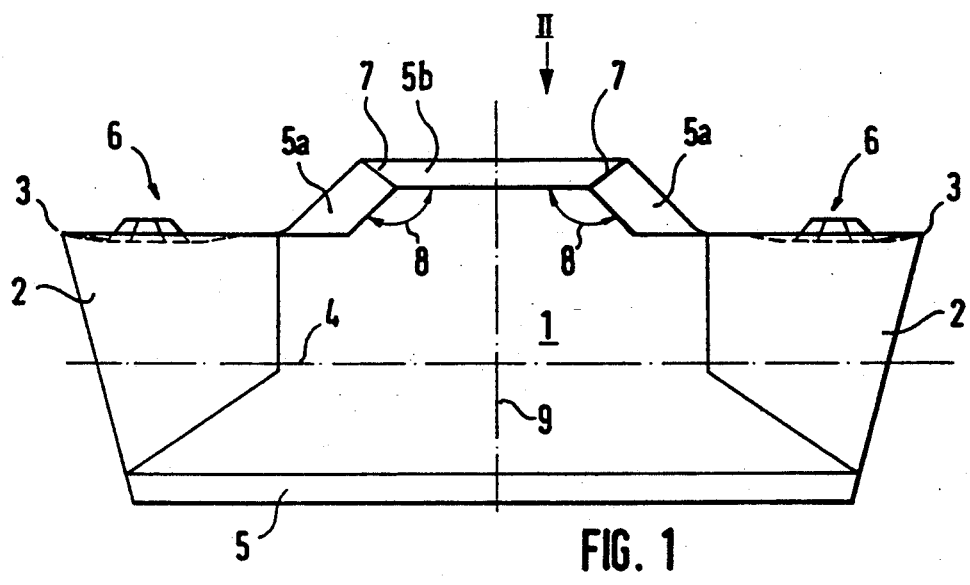
FIG. 1 shows a side elevation of an inventive tool insert.
Figure 2:
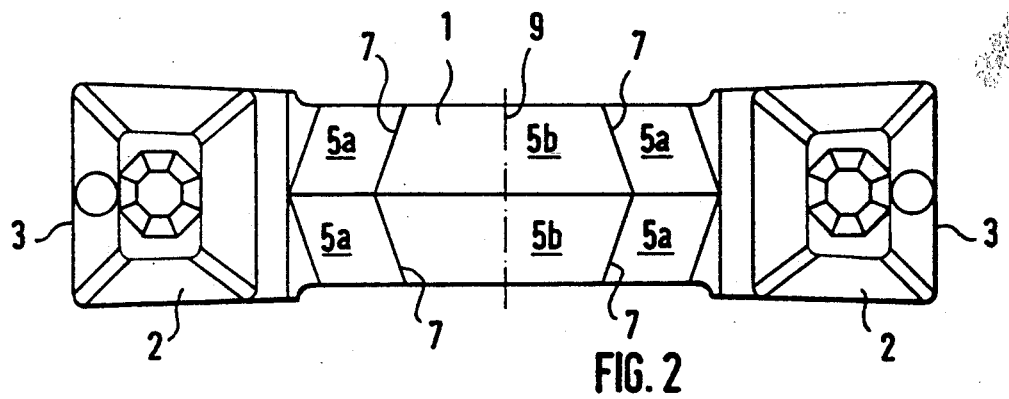
FIG. 2 shows a plan view approximately in accordance with arrow II of FIG. 1.

The tool insert of FIGS. 1 and 2 is realized as a double cutting insert, the mounting shaft 1 of which has a cutting wedge 2 with cutting edges 3 at each of its opposite ends. On opposite sides with respect to the longitudinal axis 4, convex-prismatically disposed abutment faces 5 are in each case formed for the engagement with complementarily formed concave-prismatic abutment faces of opposite clamping jaws (see FIG. 3). The upper side in the representation of the mounting shaft 1 has three clamping surface sections disposed one behind the other in the longitudinal direction 4, namely the two outer clamping surface sections 5a immediately adjacent to the clamping surface 6, and the middle clamping surface section 5b, which is disposed between these. At the respective boundary edges 7 of the outer clamping surface sections 5a, the planes of the middle clamping surface section 5b and the planes of the outer clamping surface sections 5a in each case enclose the same obtuse angle 8. The middle cross sectional axis 9 of the mounting shaft 1 or of the tool insert forms an axis of symmetry, with respect to which the two outer clamping surface sections 5a are disposed symmetrically. The middle clamping surface section 5b at the upper side of the mounting shaft 1 runs parallel to the clamping surface 5 at the underside of the mounting shaft 1. The two outer clamping surface sections 5a, as are the two cutting wedges 2, are disposed redundantly to one another and enable the tool insert to be used twice.

Figure 3:
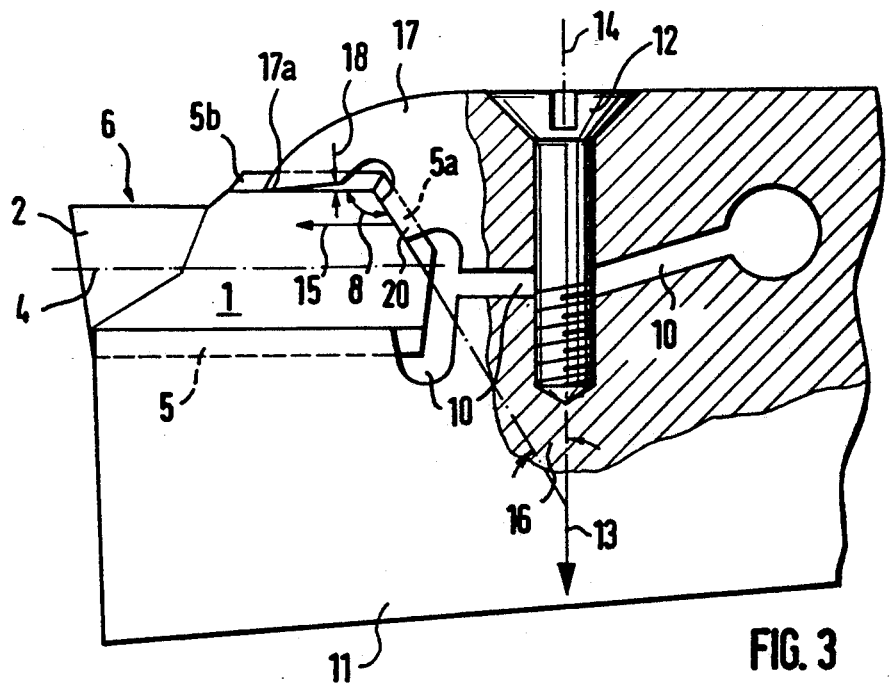
FIG. 3 shows a partially cut-out side elevation of a part of the tool support, in which a tool insert is clamped.
Figure 4:
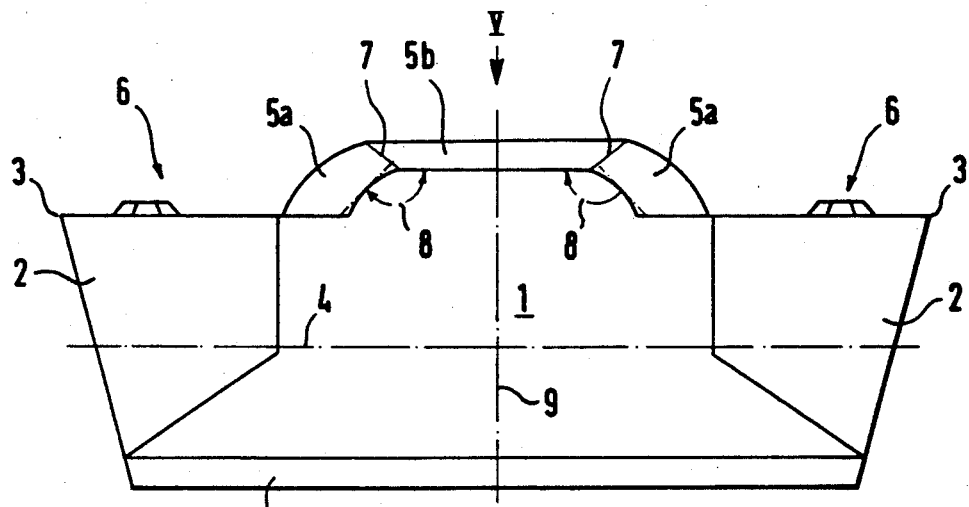
FIGS. 4 to 6 and 7 to 9 show two modifications of the invention in views corresponding in each case to FIGS. 1 to 3.
Figure 5:
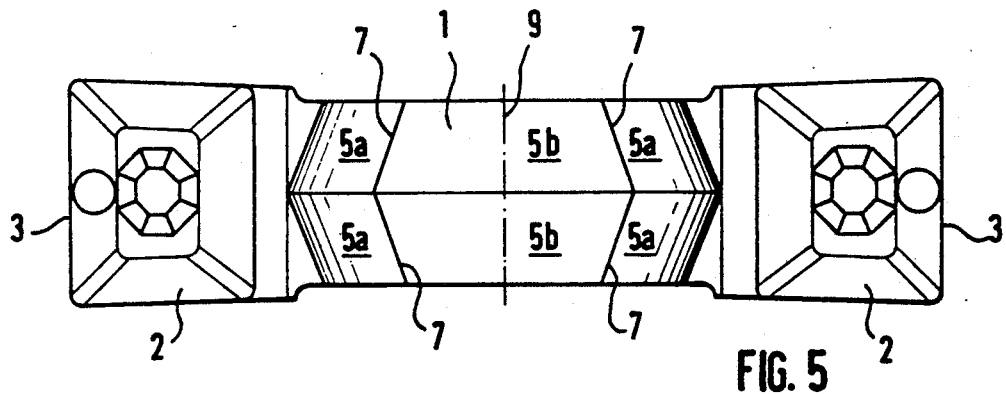
Figure 6:
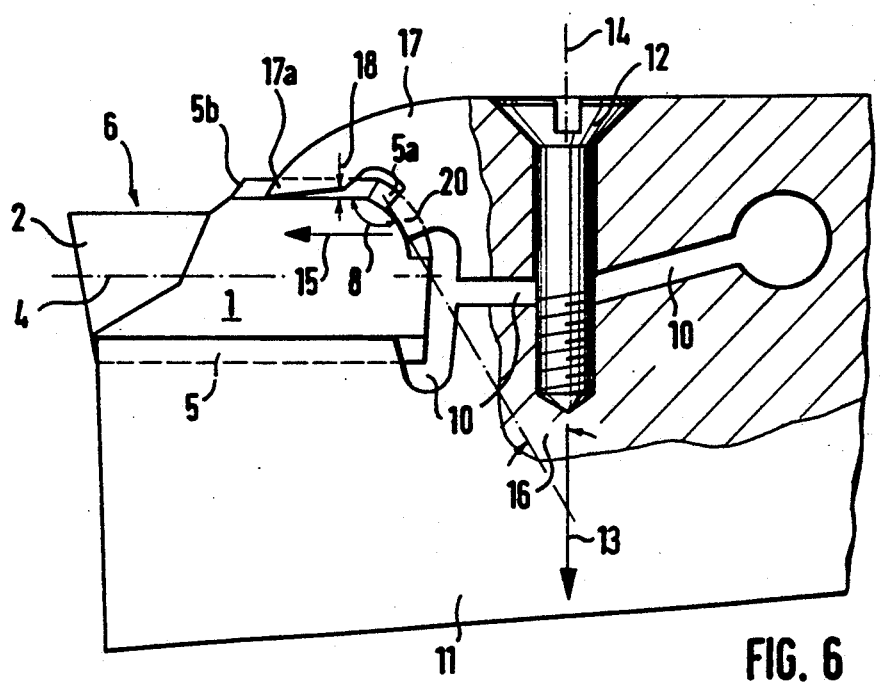
Figure 7:
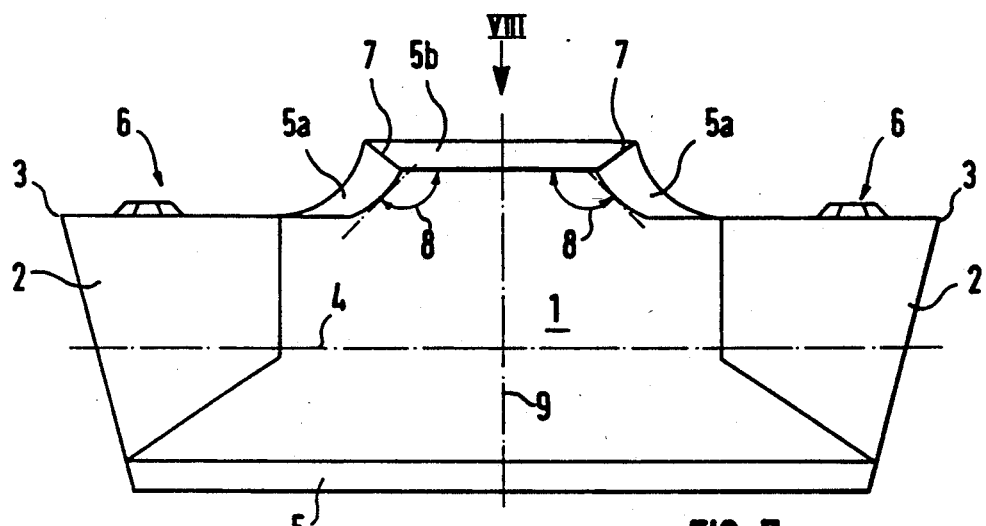
Figure 8:
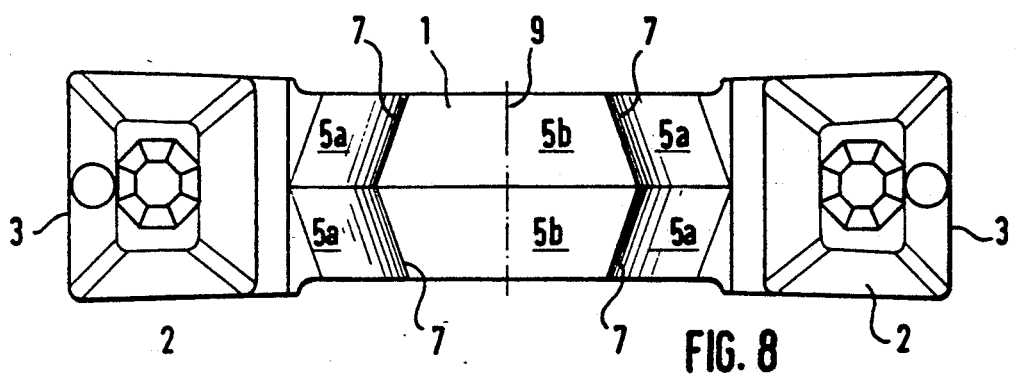
Figure 9:
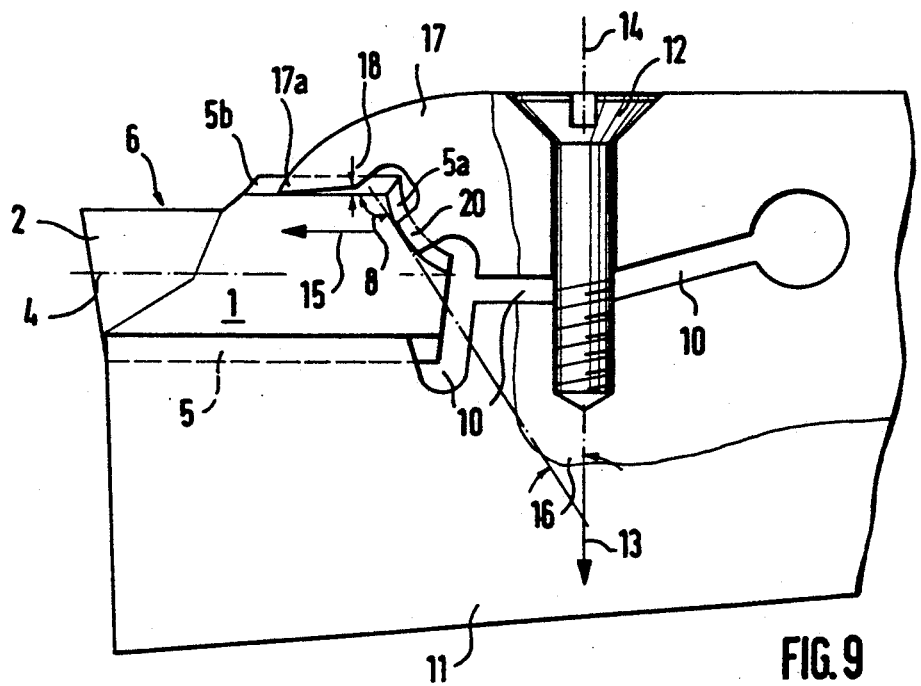

The mode of action of the inventive clamping geometry is illustrated in FIG. 3, according to which a tool insert with only one cutting wedge 2 is clamped in a clamping gap 10 of a tool support 11. A tightening screw 12 passes through the tool support 11 as well as through the clamping gap 10. When turned appropriately, the tightening screw 12 produces a clamping force 13 in the longitudinal direction 14 of the tightening screw 12. This brings about a narrowing of the clamping gap 10 and, along with that, a clamping of the mounting shaft 1 of the tool insert.

Corresponding to FIGS. 1 and 2, the mounting shaft 1 has above its longitudinal axis 4 two prismatic abutment surface sections 5a, 5b, which are disposed one behind the other. One of these is the rear abutment surface section 5a, which faces the interior of the tool support 11 and the other is the front abutment surface section 5b. The latter runs approxiamtely parallel to the clamping surface 5 below the longitudinal axis 4. The front abutment surface section 5b is designated a first insert surface, the clamping surface 5 is designated a second insert surface, and the rear abutment surface section 5a is designated a third insert surface. Since the two upper abutment surface sections 5a, 5b in the direction of the longitudinal axis 4 enclose the obtuse angle 8, the clamping force 13 results in a component of force 15, which is directed towards the front end opening of the clamping gap 10 or parallel to the longitudinal axis 4 of the tool insert. This effect is brought about above all by the abutment surface 5a, which forms an acute angle with the clamping force 13; it has, as it were, the function of an inclined plane or of a sloping ramp, by means of which the clamping force 13 is split into different components of force, including the component of force 15, which is directed towards the clamping gap opening. The two upper abutment surface sections 5a, 5b thus each form one leg of a wedge. When the tightening screw 12 is tightened, the leg, which is formed by the inner wedge or abutment surface section 5a, pushes the clamping shaft 1 forwards towards the front end opening of the clamping gap 10 and so reinforces the overall clamping of the cutter bit.

In the Example, the inner rear abutment surface 5a of the tool insert is in contact with the jaw 17, which can be propped open, of the tool support 11 over a jaw projection 20 and so forms with this a continuous, common clamping surface. On the other hand, the clamping surface, which has a common surface with the abutment surface section 5b, is reduced to a clamping point 17a, which is situated immediately in front and which is formed by a spreading out or divergence 18 between the opposite abutment surfaces of the jaw 17, which can be propped open, and the mounting shaft 1. The upper jaw 17 is designated a first clamping jaw, and the lower jaw indicated at 11 in FIG. 3 is designated a second clamping jaw. An expulsion of the cutter bit from the clamping gap 10 when the tightening screw 12 is tightened is reliably avoided by these means.

The two further variations of the invention which are shown in FIGS. 4 to 6 and 7 to 9, differ from the first embodiment by the special design of the respective, separate, sloping clamping surface sections 5b between the tool insert and the jaw projection 20. According to FIGS. 4 to 6, the abutment surfaces at the tool insert required for this are rounded concavely in the longitudinal direction 4 of the tool insert and the contacting surface of the jaw projection 20 is rounded complementarily convex. Conversely, the corresponding abutment surfaces of the tool insert of FIGS. 7 to 9 bulge convexly and the surfaces of the jaw projection, which contact thereon, are indented or bent concavely.

I claim:

1. A cutting tool comprising a tool support means having opposed first and second clamping jaws spaced from one another and having an open end, a cutting tool insert insertable between said first and second clamping jaws, said first and second clamping jaws having respective opposed first and second clamping jaw surfaces, said tool insert having opposite sides, said second jaw surface engaging one of said sides of said tool insert, said second jaw surface being parallel to said one side of said tool insert, said first jaw surface being engageable with the other of said sides of said tool insert, said first jaw surface extending at an acute angle relative to said other side of said tool insert, tightening means on said first and second clamping jaws providing a closing clamping force to said first and second clamping jaws such that said first and second jaw surfaces apply a clamping force to said opposite sides of said tool insert, said first clamping jaw having a third jaw surface, said tool insert having a third insert surface engaged by said third jaw surface, said third jaw surface and said third insert surface being parallel to one another and being disposed at an acute angle relative to the direction of said clamping force applied by said tightening means such that tightening of said tightening means results in a force component at the engagement of said third jaw surface and said third insert surface, said force component being directed toward said open end of said clamping jaw.

2. A cutting tool according to claim 1, wherein said tightening means comprises an elongated threaded means having a longitudinal axis, said third jaw surface and said third insert surface being disposed at an acute angle relative to said longitudinal axis.

3. A cutting tool according to claim 1, wherein said tool insert has a longitudinal axis, said opposite sides of said tool insert having first and second matable insert surfaces, said first and second jaw surfaces being matable with said first and second matable insert surfaces, said first matable insert surface being longitudinally displaced relative to said third insert surface.

4. A cutting tool according to claim 3, wherein said first matable insert surface is disposed at an obtuse angle relative to said third insert surface.

5. A cutting tool according to claim 3, wherein said third insert surface is disposed between said first matable insert surface and said tightening means.

6. A cutting tool according to claim 1, wherein said first clamping jaw is movable toward said second clamping jaw when said tightening means applies said clamping force.

7. A cutting tool according to claim 6, wherein said first clamping jaw has a projection extending into the space between said first and second clamping jaws, said third jaw surface being disposed on said projection.

8. A cutting tool comprising a tool support means having opposed first and second clamping jaws spaced from one another and having an open end, a cutting tool insert insertable between said first and second clamping jaws, said first and second clamping jaws having respective opposed first and second clamping jaw surfaces, said tool insert having opposite sides, said second jaw surface engaging one of said sides of said tool insert, said second jaw surface being parallel to said one side of said tool insert, said first jaw surface being engageable with the other of said sides of said tool insert, said first jaw surface extending at an acute angle relative to said other side of said tool insert, tightening means on said first and second clamping jaws providing a closing clamping force to said first and second clamping jaws such that said first and second jaw surfaces apply a clamping force to said opposite sides of said tool insert, said first clamping jaw having a third jaw surface, said tool insert having a third insert surface engaged by said third jaw surface, said third jaw surface and said third insert surface being parallel to one another and being disposed at an acute angle relative to the direction of said clamping force applied by said tightening means such that a force component results from the engagement of said third jaw surface and said third insert surface, said force component being directed toward said open end of said clamping jaw, said first and second jaw surfaces having a generally V-shaped cross-sectional configuration, said opposite sides of said tool insert each having a generally V-shaped cross-sectional configuration, said third jaw surface and said third insert surface each having a generally V-shaped cross-sectional configuration.

9. A cutting tool comprising a tool support means having opposed first and second clamping jaws spaced from one another and having an open end, a cutting tool insert insertable between said first and second clamping jaws, said first and second clamping jaws having respective opposed first and second clamping jaw surfaces, said tool insert having opposite sides, said second jaw surface engaging one of said sides of said tool insert, said second jaw surface being parallel to said one side of said tool insert, said first jaw surface being engageable with the other of said sides of said tool insert, said first jaw surface extending at an acute angle relative to said other side of said tool insert, tightening means on said first and second clamping jaws providing a closing clamping force to said first and second clamping jaws such that said first and second jaw surfaces apply a clamping force to said opposite sides of said tool insert, said first clamping jaw having a third jaw surface, said tool insert having a third insert surface engaged by said third jaw surface, said third insert surface having a generally V-shaped cross-sectional configuration, said third jaw surface and said third insert surface being parallel to one another and being disposed at an acute angle relative to the direction of said clamping force applied by said tightening means such that a force component results from the engagement of said third jaw surface and said third insert surface, said force component being directed toward said open end of said clamping jaw.

10. A cutting tool comprising a tool support means having opposed first and second clamping jaws spaced from one another and having an open end, a cutting tool insert insertable between said first and second clamping jaws, said first and second clamping jaws having respective opposed first and second clamping jaw surfaces, said tool insert having opposite sides, said second jaw surface engaging one of said sides of said tool insert, said second jaw surface being parallel to said one side of said tool insert, said first jaw surface being engageable with the other of said sides of said tool insert, said first jaw surface extending at an acute angle relative to said other side of said tool insert, tightening means on said first and second clamping jaws providing a closing clamping force to said first and second clamping jaws such that said first and second jaw surfaces apply a clamping force to said opposite sides of said tool insert, said first clamping jaw having a third jaw surface, said tool insert having a third insert surface engaged by said third jaw surface, said third insert surface being an arcuate surface, said third jaw surface and said third insert surface being parallel to one another and being disposed at an acute angle relative to the direction of said clamping force applied by said tightening means such that a force component results from the engagement of said third jaw surface and said third insert surface, said force component being directed toward said open end of said clamping jaw.

11. A cutting tool comprising a tool support means having opposed first and second clamping jaws spaced from one another and having an open end, a cutting tool insert insertable between said first and second clamping jaws, said first and second clamping jaws having respective opposed first and second clamping jaw surfaces, said tool insert having opposite sides, said second jaw surface engaging one of said sides of said tool insert, said second jaw surface being parallel to said one side of said tool insert, said first jaw surface being engageable with the other of said sides of said tool insert, said first jaw surface extending at an acute angle relative to said other side of said tool insert, tightening means on said first and second clamping jaws providing a closing clamping force to said first and second clamping jaws such that said first and second jaw surfaces apply a clamping force to said opposite sides of said tool insert, said first clamping jaw having a third jaw surface, said tool insert having a third insert surface engaged by said third jaw surface, said third insert surface being a concave surface, said third jaw surface and said third insert surface being parallel to one another and being disposed at an acute angle relative to the direction of said clamping force applied by said tightening means such that a force component results from the engagement of said third jaw surface and said third insert surface, said force component being directed toward said open end of said clamping jaw.

12. A cutting tool comprising a tool support means having opposed first and second clamping jaws spaced from one another and having an open end, a cutting tool insert insertable between said first and second clamping jaws, said first and second clamping jaws having respective opposed first and second clamping jaw surfaces, said tool insert having opposite sides, said second jaw surface engaging one of said sides of said tool insert, said second jaw surface being parallel to said one side of said tool insert, said first jaw surface being engageable with the other of said sides of said tool insert, said first jaw surface extending at an acute angle relative to said other side of said tool insert, tightening means on said first and second clamping jaws providing a closing clamping force to said first and second clamping jaws such that said first and second jaw surfaces apply a clamping force to said opposite sides of said tool insert, said first clamping jaw having a third jaw surface, said tool insert having a third insert surface engaged by said third jaw surface, said third insert surface being a convex surface, said third jaw surface and said third insert surface being parallel to one another and being disposed at an acute angle relative to the direction of said clamping force applied by said tightening means such that a force component results from the engagement of said third jaw surface and said third insert surface, said force component being directed toward said open end of said clamping jaw.

13. A cutting tool insert adapted to be clamped between opposed clamping jaws, said tool insert having opposite sides provided with opposed first and second insert surfaces to be engaged by opposed first and second clamping surfaces, said tool insert having an outer end having a cutting edge, said first insert surface having a forward end and a rear end, said forward end being closer to said cutting edge than said rear end, said tool insert having a third insert surface extending from said rear end of said first insert surface at an obtuse angle relative to said first insert surface such that said third insert surface is adapted to be engaged by a third clamping jaw surface on one of said clamping jaws to provide a force component acting on said tool insert generally parallel to said first insert surface, said third insert surface being a concave surface.

* * * * *